United States Patent
Wang et al.

(10) Patent No.: US 11,425,757 B2
(45) Date of Patent: Aug. 23, 2022

(54) DATA TRANSMISSION METHOD AND DEVICE WITH LOW LATENCY AND LOW RESOURCE UTILIZATION

(71) Applicant: HUAWEI TECHNOLOGIES CO., LTD., Guangdong (CN)

(72) Inventors: Hong Wang, Beijing (CN); Wei Quan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 145 days.

(21) Appl. No.: 16/786,668

(22) Filed: Feb. 10, 2020

(65) Prior Publication Data

US 2020/0178317 A1 Jun. 4, 2020

Related U.S. Application Data

(63) Continuation of application No. PCT/CN2017/097277, filed on Aug. 11, 2017.

(51) Int. Cl.
*H04W 74/08* (2009.01)
*H04W 76/19* (2018.01)
*H04W 76/27* (2018.01)
*H04W 72/14* (2009.01)

(52) U.S. Cl.
CPC ....... *H04W 74/0833* (2013.01); *H04W 72/14* (2013.01); *H04W 76/19* (2018.02); *H04W 76/27* (2018.02)

(58) Field of Classification Search
CPC . H04W 74/0833; H04W 76/19; H04W 76/27; H04W 72/14
See application file for complete search history.

(56) References Cited

U.S. PATENT DOCUMENTS

2011/0299492 A1* 12/2011 Lee ............... H04W 74/002
370/329
2013/0077484 A1 3/2013 Zhao et al.
(Continued)

FOREIGN PATENT DOCUMENTS

CN 102387495 A 3/2012
CN 103582073 A 2/2014
(Continued)

OTHER PUBLICATIONS

Qualcomm Incorporated:"Early data transmission", 3GPP TSG-RAN WG1 Meeting #89, R1-1708800, Hangzhou, China, May 15-19, 2017. total 10 pages. XP051262675.
(Continued)

*Primary Examiner* — Walli Z Butt
(74) *Attorney, Agent, or Firm* — Womble Bond Dickinson (US) LLP

(57) ABSTRACT

A data transmission method and a device are provided, so as to resolve problems of low resource utilization and inability to meet a requirement on a data transmission delay. The method includes: sending, by a terminal device, a random access request message to a network device by using a first random access resource; sending, by the network device to the terminal device, a random access response message that includes first information, where the first information is used to indicate a transmission resource allocated by the network device to the terminal device; and sending, by the terminal device based on a result of comparing a size of the transmission resource with a size of an RRC message and/or a result of comparing the size of the transmission resource with a size of second data, first data to the network device by using a specified message.

17 Claims, 8 Drawing Sheets

(56) References Cited

U.S. PATENT DOCUMENTS

| | | | |
|---|---|---|---|
| 2013/0336176 A1 | 12/2013 | Rubin et al. | |
| 2016/0073292 A1* | 3/2016 | Fan | H04W 74/0833 370/230 |
| 2017/0099660 A1 | 4/2017 | Oh | |
| 2018/0199381 A1 | 7/2018 | Rong et al. | |
| 2019/0053285 A1* | 2/2019 | Martin | H04W 74/0833 |

FOREIGN PATENT DOCUMENTS

| | | |
|---|---|---|
| CN | 103828481 A | 5/2014 |
| CN | 103916931 A | 7/2014 |
| CN | 104823509 A | 8/2015 |
| CN | 106507497 A | 3/2017 |
| CN | 106664511 A | 5/2017 |
| JP | 2018532324 A | 11/2018 |
| WO | 2016007257 A1 | 1/2016 |
| WO | 2017052445 A1 | 3/2017 |

OTHER PUBLICATIONS

Ericsson: "Early data transmission for NB-IoT", 3GPP TSG-RAN WG1 #89s, R1-1706895, Hangzhou, China, May 15-19, 2017, total 8 pages. XP051272126.

Ericsson: "Early data transmission for LTE-MTC", 3GPP TSG-RAN WG1 #89s, R1-1706886, Hangzhou, China, May 15-19, 2017, total 9 pages. XP051272117.

Ericsson: "Early data transmission for MTG", 3GPP TSG RAN1#88bis, R1-1706161, Spokane, US, Apr. 3-7, 2017, total 8 pages. XP051252498.

3GPP TSG RAN WG1 Meeting #89,R1-1707570:"Data transmission during random access procedure in MTC",LG Electronics,Hangzhou, P.R. China, May 15-19, 2017,total 5 pages.

3GPP TSG RAN WG1 Meeting #88bis,R1-1706463,WF on DL PTRS design,ZTE et al,Spokane, USA Apr. 3-7, 2017,total 2 pages.

Sunplus mMobile Inc., RA Response format, R2-081881, TSG-RAN WG2 Meeting #61bis, Shenzhen, China, Mar. 31-Apr. 4, 2008, 8 pages.

3GPP TS 36.331-d61:3rd Generation Partnership Project; Technical Specification Group Radio Access Network; Evolved Universal Terrestrial Radio Access (E-UTRA);Radio Resource Control (RRC);Protocol specification(Release 13), Jul. 2017,total 624 pages.

3GPP TS 36.321 V13.6.0:"3rd Generation Partnership Project; Technical Specification Group Radio Access Network; Evolved Universal Terrestrial Radio Access (E-UTRA);Medium Access Control (MAC) protocol specification(Release 13)",Jun. 2017,total 93 pages.

Samsung,"Data transfer in inactive state based on 4-step RACH procedures",3GPP TSG-RAN WG2 #97 Athens, Greece, 13 Feb. 17, 2017 ,R2-1701529,total 7pages.

* cited by examiner

| R | TA command | | | |
|---|---|---|---|---|
| TA command | | UL Grant | | |
| UL Grant | | | | |
| UL Grant | | | | |
| UL Grant1 | | | | |
| UL Grant1 | | | | |
| UL Grant1 | R | R | R | R |
| T C-RNTI | | | | |
| T C-RNTI | | | | |

| R | R | R | R | UL Grant1 |
|---|---|---|---|---|
| UL Grant1 | | | | |
| UL Grant1 | | | | |

DATA TRANSMISSION METHOD AND DEVICE WITH LOW LATENCY AND LOW RESOURCE UTILIZATION

CROSS-REFERENCE TO RELATED APPLICATIONS

This application is a continuation of International Application No. PCT/CN2017/097277, filed on Aug. 11, 2017, the disclosure of which is hereby incorporated by reference in its entirety.

TECHNICAL FIELD

This application relates to the field of wireless communications technologies, and in particular, to a data transmission method and a device.

BACKGROUND

Machine type communication (MTC) pursues a relatively long battery working time of a terminal device and a relatively low cost of the terminal device, that is, an MTC terminal device is required to implement low power consumption and low cost. Considering an application environment of the MTC terminal device, for example, a water meter or an electricity meter, to ensure that signal coverage strength of the terminal device meets a signal receiving requirement, a network device and the terminal device need to support extended coverage. Currently, a main method for implementing extended coverage is repeatedly sending an uplink signal or a downlink signal for a plurality of times, and receiving and combining signals for a plurality of times, to improve a data receiving success rate.

In an existing technical solution in which an MTC terminal device transmits data to a network device, data reported by the terminal device, for example, data reported by a water meter, may be reported once a day or once a week, and a data volume of the reported data is relatively small. The terminal device needs to establish a radio resource control (RRC) connection to the network device each time before reporting the data. In addition, in the prior art, signaling interaction in an RRC connection establishment procedure is complex, and some signaling overheads are required. If the RRC connection establishment procedure in the prior art is used only to transmit a relatively small volume of data, resource utilization is low, because a large quantity of resources are used in the RRC connection establishment procedure, but a small quantity of resources are used for data transmission. In addition, if the data reported by the terminal device has a relatively high requirement on a delay, because the RRC connection establishment procedure in the prior art is performed before the data is reported, and the establishment procedure requires some time overheads, a requirement of data transmission on a delay may not be met.

In conclusion, the existing technical solution in which the MTC terminal device transmits data to the network device has a problem of low resource utilization, and may not meet a requirement on a data transmission delay.

SUMMARY

Embodiments of this application provide a data transmission method and a device, so as to resolve problems, existing in an existing technical solution in which a MTC terminal device transmits data to a network device, of low resource utilization and inability to meet a requirement on a data transmission delay.

According to a first aspect, an embodiment of this application provides a data transmission method, including:

sending, by a terminal device, a random access request message to a network device by using a first random access resource, where the first random access resource is used to indicate that the terminal device requests to transmit first data in an initial access process;

receiving, by the terminal device, a random access response message that is sent by the network device and that includes first information, where the first information is used to indicate a transmission resource allocated by the network device to the terminal device; and sending, by the terminal device based on a result of comparing a size of the transmission resource with a size of a radio resource control (RRC) message and/or a result of comparing the/a size of the transmission resource with a size of second data, the first data to the network device by using a specified message, where the size of the second data is a sum of the size of the RRC message and a size of the first data.

According to the foregoing method, the terminal device indicates, to the network device by using the first random access resource, that the terminal device requests to transmit the first data in the initial access process, and determines, based on the transmission resource allocated by the network device, to transmit the first data to the network device by using a preset message, further implementing that the terminal device transmits the first data to the network device in the initial access process. Compared with a prior-art method in which a terminal device sends first data to a terminal device after establishing an RRC connection to the network device, the foregoing method in which the terminal device may send the first data to the network device in the initial access process, and the terminal device may transmit the first data to the network device in advance reduces a delay existing when the first data is transmitted, and reduces consumption of resources required for transmitting the first data.

In one embodiment, the first random access resource includes a random access preamble and/or a random access time-frequency resource.

According to the foregoing method, the terminal device indicates, to the network device by using the random access preamble and/or the random access time-frequency resource, that the terminal device requests to transmit the first data in the initial access process.

In one embodiment, before the terminal device sends the random access request message to the network device by using the first random access resource, the terminal device may further perform the following method:

receiving, by the terminal device, second information sent by the network device, where the second information is used to indicate at least one second random access resource, and the at least one second random access resource is used to indicate that the terminal device requests to transmit the first data in the initial access process; and when determining that the first data needs to be transmitted in the initial access process, selecting, by the terminal device, one from the at least one second random access resource as the first random access resource.

According to the foregoing method, the terminal device obtains at least one second random access resource from the network device, and selects the first random access resource from the at least one second random access resource, where the second random access resource is used to indicate that the terminal device requests to transmit at least one second random access resource of the first data in the initial access process.

In one embodiment, that the second information is used to indicate at least one second random access resource, and the at least one second random access resource is used to indicate that the terminal device requests to transmit the first data in the initial access process is specifically:

the second information is used to indicate at least one second random access resource corresponding to each coverage level, and the at least one second random access resource corresponding to each coverage level is used to indicate that the terminal device at the coverage level requests to transmit the first data in the initial access process.

According to the foregoing method, the terminal device may obtain at least one second random access resource corresponding to each coverage level, and when determining that the first data needs to be transmitted in the initial access process, the terminal device first determines a coverage level to which the terminal device belongs, and then selects, as the first random access resource, one from at least one second random access resource corresponding to the coverage level to which the terminal device belongs.

In one embodiment, when the second random access resource includes a random access preamble, a manner in which the second information indicates the at least one second random access resource includes but is not limited to the following three manners:

Manner 1: The second information includes an index of at least one random access preamble.

Manner 2: The second information includes positions and a quantity of random access preambles, in all contention-based random access preambles, that are used to indicate that the terminal device requests to transmit the first data in the initial access process.

Manner 3: The second information includes positions and percentages of random access preambles, in all contention-based random access preambles, that are used to indicate that the terminal device requests to transmit the first data in the initial access process.

In one embodiment, before the terminal device sends the random access request message to the network device by using the first random access resource, that the terminal device determines that the first data needs to be transmitted in the initial access process is specifically:

the terminal device may determine, by using an RRC layer, that the network device supports data transmission in the initial access process; and the terminal device may notify, by using the RRC layer, a non-access stratum NAS of the terminal device that the network device supports data transmission in the initial access process.

In one embodiment, the sending, by the terminal device based on a result of comparing a size of the transmission resource with a size of a radio resource control (RRC) message and/or a result of comparing the/a size of the transmission resource with a size of second data, the first data to the network device by using a specified message may be specifically implemented in the following four manners.

Manner 1: If the size of the transmission resource is greater than or equal to the size of the second data, the terminal device sends, in a position of the third message that is sent between the terminal device and the network device in the initial access process, the first data to the network device by using the RRC message. In the present invention, the RRC message may be the third message.

In this manner, compared with a prior-art method in which a terminal device sends first data to a terminal device after establishing an RRC connection to the network device, the foregoing method in which the terminal device sends the first data to the network device by using the RRC message in the initial access process, and the terminal device transmits the first data to the network device in advance reduces a delay existing when the first data is transmitted, and reduces consumption of resources required for transmitting the first data. The RRC message may be an RRC connection setup request message or an RRC connection resume request message, or may be a new RRC message introduced when the first data is transmitted in a random access process.

Manner 2: If the size of the transmission resource is greater than the size of the RRC message and the size of the transmission resource is less than the size of the second data, the terminal device sends, in a position of the third message that is sent between the terminal device and the network device in the initial access process, partial data of the first data to the network device by using the RRC message, and sends remaining data of the first data to the network device by using an uplink message following the RRC message.

In this manner, compared with a prior-art method in which a terminal device sends first data to a terminal device after establishing an RRC connection to the network device, the foregoing method in which the terminal device sends the partial data of the first data to the network device by using the RRC message in the initial access process, and the terminal device transmits the partial data of the first data to the network device in advance reduces a delay existing when the partial data of the first data is transmitted. The RRC message may be an RRC connection setup request message or an RRC connection resume request message, or may be a new RRC message introduced when the first data is transmitted in a random access process.

Manner 3: If the size of the transmission resource is greater than the size of the RRC message and the size of the transmission resource is less than the size of the second data, the terminal device sends the first data to the network device by using an uplink message following the third message that is sent between the terminal device and the network device in the initial access process.

This manner resolves a problem that the transmission resource is insufficient for sending the RRC message and the first data. In this case, the terminal device may fall back to a data transmission procedure in the prior art.

Manner 4: If the size of the transmission resource is equal to the size of the RRC message, the terminal device sends the first data to the network device by using an uplink message following the third message that is sent between the terminal device and the network device in the initial access process.

In one embodiment, before the terminal device sends the first data to the network device by using the uplink message following the third message that is sent between the terminal device and the network device in the initial access process, the terminal device may send the RRC message to the network device in the position of the third message that is sent between the terminal device and the network device in the initial access process.

In one embodiment, before the terminal device sends the RRC message to the network device, the terminal device may automatically activate a context of the terminal device.

In a user plane method, to send the first data in the position of the third message, the first data needs to be transmitted in a service channel. In this case, the first data needs to be processed by using context information of the terminal device. In the prior art, the context information is configured by the network device for the terminal device. In a method for transmitting data by using a message 5, the network device needs to activate the context information of the terminal device. However, in this embodiment of the present invention, in the user plane method, when the first data is sent in the position of the third message, the network device cannot activate the context information of the terminal device. Therefore, the terminal device needs to activate the context information of the terminal device for processing user plane data.

In one embodiment, the RRC message is an RRC connection setup request message or an RRC connection resume request message.

In one embodiment, the terminal device is a device that performs machine type communication MTC.

According to a second aspect, an embodiment of this application provides a data transmission method. The method includes the following operations.

receiving, by a network device, a random access request message that is sent by a terminal device by using a first random access resource, where the first random access resource is used to indicate that the terminal device requests to transmit first data in an initial access process;

sending, by the network device to the terminal device, a random access response message that includes first information, where the first information is used to indicate a transmission resource allocated by the network device to the terminal device; and receiving, by the network device, the first data that is sent by the terminal device by using a specified message, where the specified message is determined by the terminal device based on a result of comparing a size of the transmission resource with a size of a radio resource control (RRC) message and/or a result of comparing the/a size of the transmission resource with a size of second data, and the size of the second data is a sum of the size of the RRC message and a size of the first data.

According to the foregoing method, the terminal device may transmit the first data to the network device in the initial access process. Compared with a prior-art method in which a terminal device sends first data to a terminal device after establishing an RRC connection to the network device, the foregoing method in which the terminal device may send the first data to the network device in the initial access process, and the terminal device may transmit the first data to the network device in advance reduces a delay existing when the first data is transmitted, and reduces consumption of resources required for transmitting the first data.

In one embodiment, the first random access resource includes a random access preamble and/or a random access time-frequency resource.

According to the foregoing method, the terminal device indicates, to the network device by using the random access preamble and/or the random access time-frequency resource, that the terminal device requests to transmit the first data in the initial access process.

In one embodiment, before the network device receives the random access request message that is sent by the terminal device by using the first random access resource, the network device may send second information to the terminal device, where the second information is used to indicate at least one second random access resource, the at least one second random access resource is used to indicate that the terminal device requests to transmit the first data in the initial access process, and the first random access resource is one of the at least one second random access resource.

According to the foregoing method, the network device sends at least one second random access resource to the terminal device, so that the terminal device can select the first random access resource from the at least one second random access resource, where the second random access resource is used to indicate that the terminal device requests to transmit at least one second random access resource of the first data in the initial access process.

In one embodiment, a manner in which the second information indicates the at least one second random access resource may be as follows: The second information is used to indicate at least one second random access resource corresponding to each coverage level, and the at least one second random access resource corresponding to each coverage level is used to indicate that the terminal device at the coverage level requests to transmit the first data in the initial access process.

In one embodiment, when the second random access resource includes a random access preamble, there may be the following three manners in which the second information indicates the at least one second random access resource:

Manner 1: The second information includes an index of at least one random access preamble.

Manner 2: The second information includes positions and a quantity of random access preambles, in all contention-based random access preambles, that are used to indicate that the terminal device requests to transmit the first data in the initial access process.

Manner 3: The second information includes positions and percentages of random access preambles, in all contention-based random access preambles, that are used to indicate that the terminal device requests to transmit the first data in the initial access process.

In one embodiment, there may be the following three specific manners in which the network device receives the first data that is sent by the terminal device by using the specified message:

Manner 1: The network device receives, in a position of the third message that is sent between the network device and the terminal device in the initial access process, the first data that is sent by the terminal device by using the RRC message.

Manner 2: The network device receives, in a position of the third message that is sent between the network device and the terminal device in the initial access process, partial data of the first data that is sent by the terminal device by using the RRC message, and receives remaining data of the first data that is sent by the terminal device by using an uplink message following the RRC message.

Manner 3: The network device receives the first data that is sent by the terminal device by using an uplink message following the third message that is sent between the terminal device and the network device in the initial access process.

In one embodiment, before the network device receives the first data that is sent by the terminal device by using the uplink message following the third message that is sent between the terminal device and the network device in the initial access process, the network device may receive the RRC message that is sent by the terminal device in the position of the third message that is sent between the terminal device and the network device in the initial access process.

In one embodiment, the RRC message is an RRC connection setup request message or an RRC connection resume request message.

According to a third aspect, an embodiment of this application provides a terminal device. The terminal device has functions of implementing operations of the terminal device in the method example provided in the first aspect. The functions may be implemented by hardware, or may be implemented by hardware executing corresponding software. The hardware or software includes one or more modules corresponding to the foregoing functions.

In one embodiment, a structure of the terminal device includes a processing unit and a transceiver unit. The processing unit is configured to support the terminal device in performing corresponding functions in the foregoing method. The transceiver unit is configured to support communication between the terminal device and another device (including a network device). The terminal device may further include a storage unit. The storage unit is configured to couple to the processing unit, and stores a program instruction and data that are necessary for the terminal device.

In another possible implementation, a structure of the terminal device includes a memory, a processor, and a communications module. The memory is configured to store a computer readable program. The processor is configured to invoke an instruction stored in the memory, to perform the method performed by the terminal device in the first aspect. The communications module is configured to receive data and/or send data under control of the processor.

For example, the processing unit may be the processor, the transceiver unit may be the communications module, and the storage unit may be the memory. The communications module may include a plurality of components, that is, include a transmitter and a receiver, or include a communications interface. The communications interface has receiving and sending functions.

According to a fourth aspect, an embodiment of this application further provides a computer storage medium. The storage medium stores a software program. When being read and executed by one or more processors, the software program may perform the method performed by the terminal device in the data transmission method provided in the first aspect.

According to a fifth aspect, an embodiment of this application further provides a data transmission apparatus. The apparatus includes a chip, and the chip is configured to perform the method performed by the terminal device in the data transmission method provided in the first aspect. The apparatus may further include a communications module. The chip included in the apparatus performs, by using the communications module, a method for receiving data and/or sending data by the terminal device in the foregoing data transmission method.

According to a sixth aspect, an embodiment of this application further provides a computer program product including an instruction. When the computer program product runs on a computer, the computer is enabled to perform the method performed by the terminal device in the data transmission method provided in the first aspect.

According to a seventh aspect, an embodiment of this application provides a network device. The network device has functions of implementing operations of the network device in the method example provided in the second aspect. The functions may be implemented by hardware, or may be implemented by hardware executing corresponding software. The hardware or software includes one or more modules corresponding to the foregoing functions.

In one embodiment, a structure of the network device includes a transceiver unit and a processing unit. The transceiver unit is configured to support communication between the network device and another device (including a terminal device). The processing unit is configured to support the network device in performing corresponding functions in the foregoing method. The network device may further include a storage unit. The storage unit is configured to couple to the processing unit, and stores a program instruction and data that are necessary for the network device.

In another possible implementation, a structure of the network device includes a memory, a processor, and a communications module. The memory is configured to store a computer readable program. The processor is configured to invoke an instruction stored in the memory, to perform the method performed by the network device in the second aspect. The communications module is configured to receive data and/or send data under control of the processor.

For example, the processing unit may be the processor, the transceiver unit may be the communications module, and the storage unit may be the memory. The communications module may include a plurality of components, that is, include a transmitter and a receiver, or include a communications interface. The communications interface has receiving and sending functions.

According to an eighth aspect, an embodiment of this application further provides a computer storage medium. The storage medium stores a software program. When being read and executed by one or more processors, the software program may perform the method performed by the network device in the data transmission method provided in the second aspect.

According to a ninth aspect, an embodiment of this application further provides a data transmission apparatus. The apparatus includes a chip, and the chip is configured to perform the method performed by the network device in the data transmission method provided in the second aspect. The apparatus may further include a communications module. The chip included in the apparatus performs, by using the communications module, a method for receiving data and/or sending data by the network device in the foregoing data transmission method.

According to a tenth aspect, an embodiment of this application further provides a computer program product including an instruction. When the computer program product runs on a computer, the computer is enabled to perform the method performed by the network device in the data transmission method provided in the second aspect.

According to an eleventh aspect, an embodiment of this application further provides a communications system. The communications system includes a terminal device and a network device. The terminal device is configured to perform the method performed by the terminal device in the data transmission method provided in the first aspect, and the terminal device may be a device the same as the terminal device provided in the third aspect. The network device is configured to perform the method performed by the network device in the data transmission method provided in the second aspect, and the network device may be a device the same as the network device provided in the seventh aspect. The data transmission method provided in the embodiments of this application may be implemented by using the communications system.

DESCRIPTION OF EMBODIMENTS

Figure 1A:
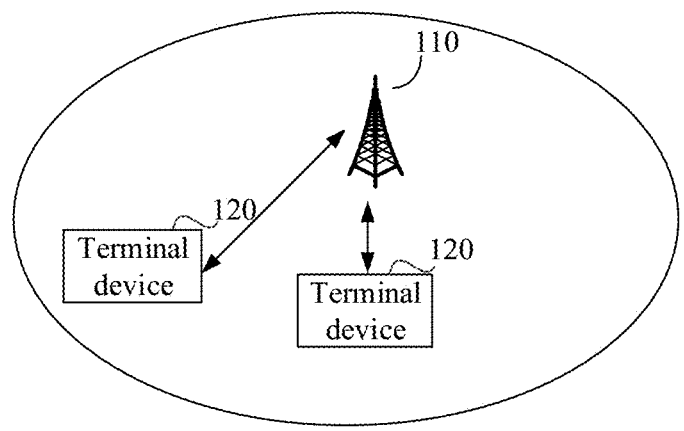
FIG. 1A is a schematic diagram of a network architecture to which an embodiment of this application is applicable according to an embodiment of this application.

The technical solutions provided in the embodiments of this application are applicable to a scenario in which a terminal device with lower power consumption and low cost performs communication, for example, a machine type communication (MTC) scenario. MTC pursues a relatively long battery time of a terminal device and a relatively low cost of the terminal device, that is, an MTC terminal device is required to implement low power consumption and low cost. Considering that an application environment of the terminal device that performs MTC is relatively special, for example, a water meter or an electricity meter, to implement that signal coverage strength of the terminal device meets a signal receiving requirement, a network device and the terminal device need to support extended coverage. Currently, a main method for implementing extended coverage is repeatedly sending an uplink signal or a downlink signal for a plurality of times, and receiving and combining signals for a plurality of times, to improve a data receiving success rate.

In an existing technical solution in which an MTC terminal device transmits data to a network device, data reported by the terminal device, for example, data reported by a water meter, may be reported once a day or once a week, and a data volume of the reported data is relatively small. When the terminal device does not need to report data, the terminal device does not establish an RRC connection to the network device, and in this case, the terminal device is in an idle state. When the terminal device needs to report data, the terminal device establishes an RRC connection to the network device, and the terminal device changes from the idle state to a connected state. The terminal device needs to establish a radio resource control (RRC) connection to the network device each time before reporting the data. In addition, in the prior art, signaling interaction of an RRC connection establishment procedure is complex, and some signaling overheads are required. If the RRC connection establishment procedure in the prior art is used only to transmit a relatively small volume of data, resource utilization is low, because a large quantity of resources are used in the RRC connection establishment procedure, but a small quantity of resources are used for data transmission. In addition, if the data reported by the terminal device has a relatively high requirement on a delay, because the RRC connection establishment procedure in the prior art is performed before the data is reported, and the establishment procedure requires some time overheads, a requirement of data transmission on a delay may not be met.

To resolve the foregoing problems, existing in an existing technical solution in which a MTC terminal device transmits data to a network device, of low resource utilization and inability to meet a requirement on a data transmission delay, the embodiments of this application provide a data transmission method and a device. The method and the device are based on a same inventive concept. Because problem resolving principles of the method and the device are similar, for implementation of the device and the method, mutual reference may be made, and repeated parts are not described in detail again.

Figure 1B:
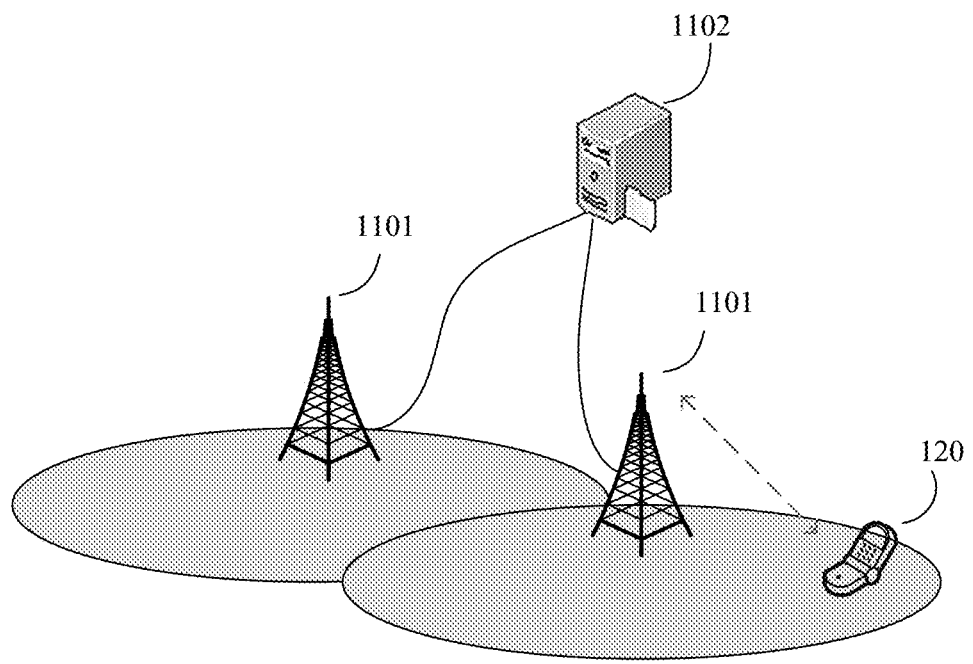
FIG. 1B is a schematic diagram of another network architecture to which an embodiment of this application is applicable according to an embodiment of this application.

The embodiments of this application may be applied to a plurality of communications systems. The systems to which the embodiments of this application are applicable include an LTE system, a $5^{th}$ generation (5G) communications system, a global system for mobile communications (GSM), a code division multiple access (CDMA) system, wideband code division multiple access (WCDMA) system, a general packet radio service (GPRS) system, a universal mobile telecommunications system (UMTS), and the like. This is not limited in the embodiments of this application. FIG. 1A is a schematic diagram of a network architecture to which an embodiment of this application is applicable. A network shown in FIG. 1A may include a network device 110 and a terminal device 120. FIG. 1B is a schematic diagram of another network architecture to which an embodiment of this application is applicable. A difference between a network shown in FIG. 1B and the network shown in FIG. 1A is that a network device in the network shown in FIG. 1B exists virtually. Some functions of the network device are implemented on a distributed unit (DU) 1101, and other functions of the network device are implemented on a centralized unit (CU) 1102. A plurality of DUs 1101 may be connected to a same CU 1102. It should be noted that each of the networks shown in FIG. 1A and FIG. 1B may include at least one network device, and there may be at least one terminal device that communicates with each network device. This is not limited to quantities of network devices shown in FIG. 1A and FIG. 1B and quantities of terminal devices shown in FIG. 1A and FIG. 1B.

A terminal device in the embodiments of this application has characteristics of lower power consumption and low cost, and may be, for example, a MTC terminal device, for example, a water meter or an electricity meter. A terminal device may be a device that provides a user with voice and/or data connectivity, a handheld device with a wireless connection function, or another processing device connected to a wireless modem. The wireless terminal device may communicate with one or more core networks through a random access network (RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal device may also be referred to as a system, a subscriber unit, a subscriber station, a mobile station, a remote station, an access point (AP), a remote terminal device, an access terminal device, a user terminal device, a user agent, a user device, or user equipment.

A network device in the embodiments of this application may be a cell, a base station, or an access point, or may be a device, in an access network, that communicates with a wireless terminal device on an air interface by using one or more sectors. For example, the network device may be an evolved NodeB (or e-NodeB) in an LTE system, or may be a base station in a 5G system. Main functions of the network device include: radio resource management, interne protocol (IP) header compression and user data stream encryption, mobility management entity (MME) selection when a terminal device is attached, routing user plane data to a serving gateway (S-GW), organization and sending of paging messages, organization and sending of broadcast messages, measurement and measurement report configuration for mobility or scheduling purposes, and the like.

The following explains a term used in the embodiments of this application.

Figure 2:
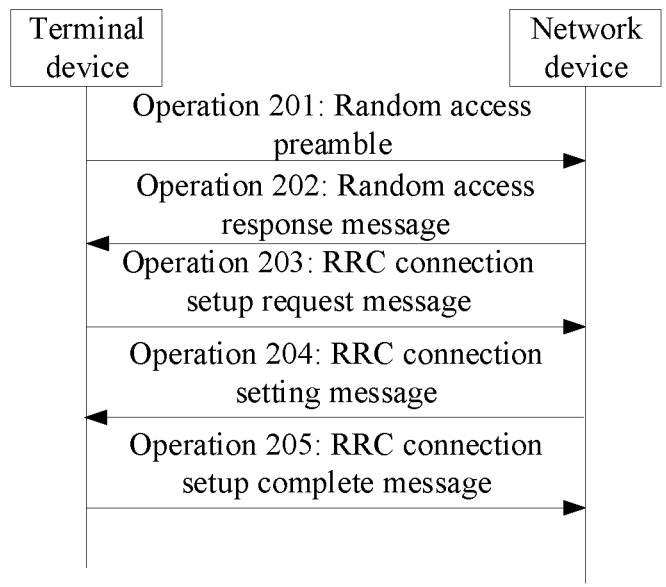
FIG. 2 is a schematic flowchart of an initial access process according to an embodiment of this application.

Initial access process:

FIG. 2 is a schematic diagram of an initial access process. The third message sent between a terminal device and a network device in the initial access process is an RRC connection setup request message. The initial access process includes the following operations.

Operation 201: The terminal device sends a random access preambleto the network device.

Operation 202: The network device sends a random access response (RAR) message to the terminal device.

Operation 203: The terminal device sends an RRC connection setup request message, for example, an RRC connection request, to the network device.

Operation 204: The network device sends an RRC connection setup message, for example, RRC connection setup, to the terminal device.

Operation 205: The terminal device sends an RRC connection setup complete message, for example, RRC connection setup complete, to the network device.

Operation 201 to operation 205 are sequentially the first message to the fifth message sent between the terminal device and the network device in the initial access process shown in FIG. 2. The first four operations are a random access process.

Figure 3:
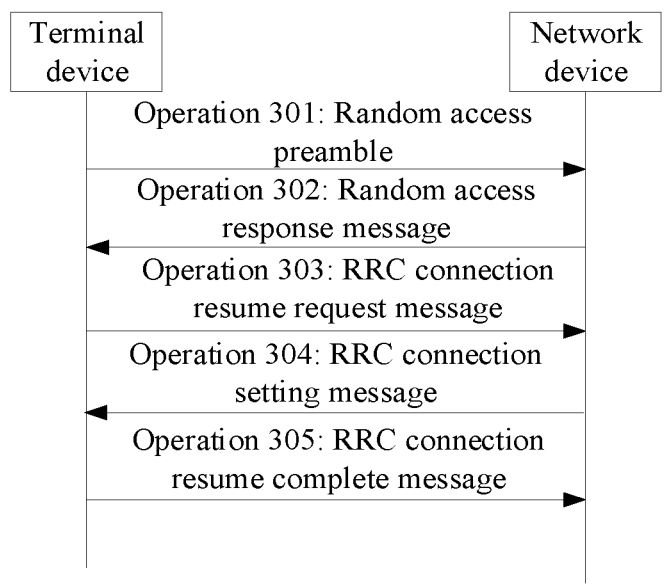
FIG. 3 is a schematic flowchart of another initial access process according to an embodiment of this application.

FIG. 3 is a schematic diagram of another initial access process. The third message sent between a terminal device and a network device in the initial access process is an RRC connection resume request message. The initial access process includes the following operations.

Operation 301: The terminal device sends a random access preamble to the network device.

Operation 302: The network device sends a random access response (RAR) message to the terminal device.

Operation 303: The terminal device sends an RRC connection resume request message, for example, an RRC connection resume request, to the network device.

Operation 304: The network device sends an RRC connection resume message, for example, RRC connection resume, to the terminal device.

Operation 305: The terminal device sends an RRC connection resume complete message, for example, RRC connection resume complete, to the network device.

Operation 301 to operation 305 are sequentially the first message to the fifth message sent between the terminal device and the network device in the initial access process shown in FIG. 3. The first four operations are a random access process.

A difference between the initial access process shown in FIG. 2 and the initial access process shown in FIG. 3 lies in that in the initial access process shown in FIG. 2, operation 203 is that the terminal device sends an RRC connection setup request message to the network device, indicating that in the initial access process shown in FIG. 2, the terminal device establishes an RRC connection to the network device for the first time, or that before the initial access process shown in FIG. 2, an RRC connection established between the terminal device and the network device is released, whereas in the initial access process shown in FIG. 3, operation 303 is that the terminal device sends an RRC connection resume request message to the network device, indicating that after the terminal device establishes an RRC connection to the network device last time, when the network device determines that the terminal device does not have data that needs to be transmitted, the network device suspends the terminal device, that is, the network device releases the RRC connection to the UE, but the network device saves context information of the terminal device, and the terminal device saves RRC configuration information configured by the network device for the terminal device. When the terminal device needs to transmit data, the terminal device sends an RRC connection resume request message to the network device, so that the network device resumes the RRC connection for the terminal device. Compared with the initial access process shown in FIG. 2, the initial access process shown in FIG. 3 reduces time overheads and signaling overheads that are used for establishing an RRC connection between the network device and the terminal device.

It should be noted that the third message sent between the terminal device and the network device in the initial access process is the RRC connection setup request message or the RRC connection resume request message. However, as a system evolves, the third message sent between the terminal device and the network device in the initial access process may be another message, and in this case, the technical solutions provided in the embodiments of this application are still applicable.

The following describes the technical solutions provided in the embodiments of this application. It should be noted that the embodiments in this application are used merely for describing the technical solutions provided in the embodiments of this application, and a sequence in which the embodiments appear does not indicate advantages or disadvantages of the technical solutions described in the embodiments.

Figure 4:
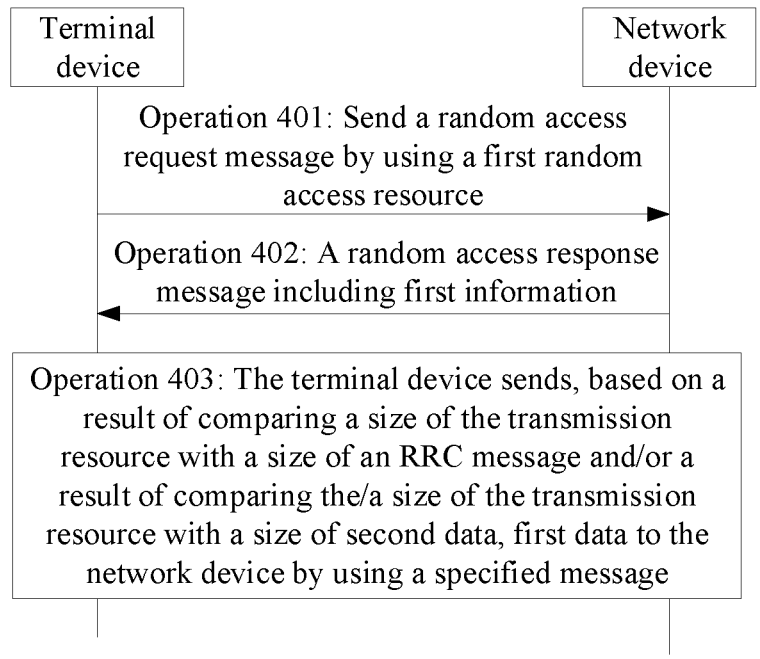
FIG. 4 is a schematic flowchart of a data transmission method according to an embodiment of this application.

An embodiment of this application provides a data transmission method. FIG. 4 is a schematic flowchart of a data transmission method. The method includes the following operations.

Operation 401: A terminal device sends a random access request message to a network device by using a first random access resource.

In operation 401, the first random access resource is used to indicate that the terminal device requests to transmit first data in an initial access process. Therefore, when the terminal device sends the random access request message to the network device by using the first random access resource, the network device can be enabled to learn, based on the first random access resource, that the terminal device requests to transmit the first data in the initial access process. The random access request message is a random access preamble, that is, a random access request is initiated by sending the random access preamble. In an implementation, the first random access resource includes a random access preamble and/or a random access time-frequency resource. To be specific, the terminal device requests, by using the random access preamble and/or the random access time-frequency resource, to transmit the first data to the network device in the initial access process. For example, the first random access resource includes a random access preamble. Different from an existing random access preamble, the random access preamble included in the first random access resource has a function of being used to indicate that the terminal device requests to transmit the first data in the initial access process. Likewise, different from an existing random access time-frequency resource, the random access time-frequency resource included in the first random access resource has a function of being used to indicate that the terminal device requests to transmit the first data in the initial access process. The first data that the terminal device requests to transmit in the initial access process is user plane data or a non-access stratum (NAS) message.

Before operation 401, manners in which the terminal device determines that the first data needs to be transmitted in the initial access process include the following two implementations.

In a first implementation, when an access stratum (AS) of the terminal device determines that the network device supports data transmission in the initial access process, the AS notifies a NAS of the terminal device that the network device supports data transmission in the initial access process. When the terminal device needs to send the first data, the first data first arrives at the NAS of the terminal device. The NAS sends the first data to the AS and requests the AS to establish an RRC connection. Because the AS can obtain system configuration information including second information, the AS sends the random access request message to the network device by using the first random access resource.

The foregoing functions performed by the AS may be implemented by an RRC layer that is included in the AS. To be specific, when the terminal device determines, by using an RRC layer, that the network device supports data transmission in the initial access process, the RRC layer notifies the NAS of the terminal device that the network device supports data transmission in the initial access process; and the terminal device sends, by using the NAS to the RRC layer, the first data that needs to be transmitted in the initial access process, and the RRC layer sends the random access request message to the network device by using the first random access resource.

In a second implementation, when the terminal device needs to send the first data, the first data first arrives at a NAS of the terminal device. When an AS of the terminal device determines that the network device supports data transmission in the initial access process, the AS notifies the NAS that the network device supports data transmission in the initial access process. Then, the NAS sends the first data to the AS and requests the AS to establish an RRC connection. Because the AS can obtain system configuration information including second information, the AS sends the random access request message to the network device by using the first random access resource.

The foregoing functions performed by the AS may be implemented by an RRC layer that is included in the AS. To be specific, the terminal device sends, by using the NAS to the RRC layer of the terminal device, the first data that needs to be transmitted in the initial access process; and when determining, by using the RRC layer, that the network device supports data transmission in the initial access process, the terminal device sends, by using the RRC layer, the random access request message to the network device by using the first random access resource.

In this embodiment, the terminal device has characteristics of lower power consumption and low cost, and may be, for example, a terminal device that performs MTC.

Operation 402: The network device sends, to the terminal device, a random access response message that includes first information, where the first information is used to indicate a transmission resource allocated by the network device to the terminal device.

In operation 402, the transmission resource that the first information is used to indicate may be a time-frequency resource. The transmission resource that the first information is used to indicate may be understood as a resource that is allocated by the network device to the terminal device and that may be used by the terminal device for sending the third message to the network device in the initial access process. For example, the third message sent between the terminal device and the network device in the initial access process may be an RRC message. The RRC message may be an RRC connection setup request message or an RRC connection resume request message.

In operation 402, that the random access response message carries the first information may be implemented in the following several manners. The first information is used to indicate the transmission resource allocated by the network device to the terminal device.

Figure 5:
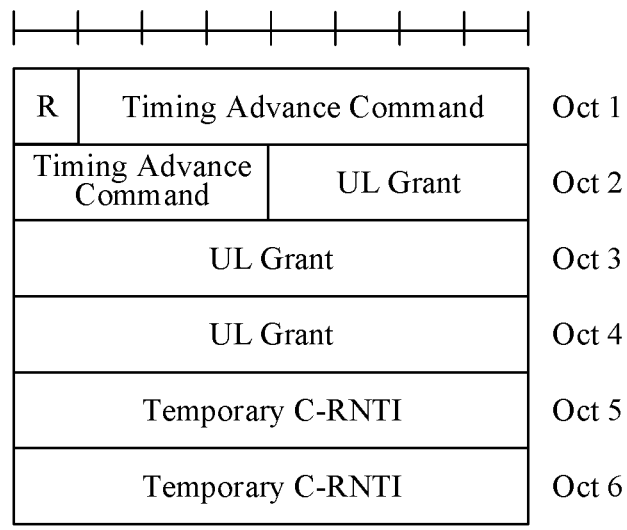
FIG. 5 is a schematic structural diagram of a first random access response message according to an embodiment of this application.

In a first implementation, the first information is carried by using a structure of an existing random access response message. FIG. 5 shows the structure of the existing random access response message. In the prior art, an uplink grant in FIG. 5 is used to indicate a transmission resource that is allocated by a network device and that is used by a terminal device for separately sending an RRC message. In this embodiment, the UL grant in FIG. 5 is extended to carry the first information. A size of the transmission resource that is indicated by the first information and that is allocated by the network device to the terminal device may be greater than or equal to a size of a transmission resource indicated by the UL grant in the prior art.

In a second implementation, the first information is carried by using a structure of an existing random access response message. FIG. 5 shows the structure of the existing random access response message. In this embodiment, a reserved bit "R" is used to indicate the first information. For example, when R=1, it indicates that the transmission resource allocated by the network device to the terminal device is a first resource, and when R=0, it indicates that the transmission resource allocated by the network device to the terminal device is a second resource. The first resource and the second resource are pre-negotiated resource amounts, a size of the first resource may be greater than a size of the second resource, and the second resource is a transmission resource that is allocated by the network device and that is used by the terminal device for separately sending an RRC message.

Figures 6, 7, 8:
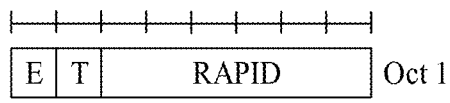
FIG. 6 is a schematic structural diagram of a second random access response message according to an embodiment of this application.
FIG. 7 is a schematic structural diagram of a third random access response message according to an embodiment of this application.
FIG. 8 is a schematic structural diagram of a MAC header in a random access response message according to an embodiment of this application.

In a third implementation, as shown in the FIG. 6, a UL Grant 1 is added in a random access response message structure provided in this embodiment, compared with a random access response message structure in the prior art. AUL Grant in FIG. 6 is used to indicate a transmission resource that is allocated by the network device and that is used by the terminal device to separately send an RRC message. The UL Grant 1 is used to indicate a transmission resource allocated by the network device to the terminal device, and the transmission resource is not a transmission resource used to separately send an RRC message. A sum of the transmission resource indicated by the UL Grant and the transmission resource indicated by the UL Grant 1 is transmission resources that are allocated by the network device to the terminal device and that are indicated by first information.

The UL Grant 1 in FIG. 6 may be of 20 bits, which is the same as the UL Grant in the prior art. In this case, four reserved bits "R" need to be introduced, where positions of the reserved bits "R" are not limited to the case shown in FIG. 6. A quantity of bits in the UL Grant 1 in FIG. 6 may also be greater than or less than 20, which is not limited.

Further, in FIG. 6, a reserved bit "R" ("R" in an upper left corner of FIG. 6) in the structure in the prior art may be used to indicate whether the random access response message is a random access response message in this embodiment or a random access response message in the prior art. For example, R=1 indicates the random access response message in this embodiment, and R=0 indicates the random access response message in the prior art, or vice versa.

In a fourth implementation, the network device sends two random access response messages to the terminal device. The first random access response message is the random access response message in the prior art shown in FIG. 5. A UL Grant in FIG. 5 is used to indicate a transmission resource that is allocated by the network device and that is used by the terminal device to separately send an RRC message. The second random access response message is the random access response message provided in this embodiment shown in FIG. 7. The UL Grant 1 in FIG. 7 is used to indicate a transmission resource allocated by the network device to the terminal device, and the transmission resource is not a transmission resource used to separately send an RRC message. A sum of the transmission resource indicated by the UL Grant in FIG. 5 and the transmission resource indicated by the UL Grant 1 in FIG. 7 is transmission resources that are allocated by the network device to the terminal device and that are indicated by the first information.

The UL Grant 1 in FIG. 7 may be of 20 bits, which is the same as the UL Grant in the prior art. In this case, four reserved bits "R" need to be introduced, where positions of the reserved bits "R" are not limited to the case shown in FIG. 7. A quantity of bits in the UL Grant 1 in FIG. 7 may also be greater than or less than 20, which is not limited.

Both the random access response message in the prior art shown in FIG. 5 and the random access response message provided in this embodiment shown in FIG. 7 use a structure of a MAC header shown in FIG. 8.

In a fourth implementation, when the network device sends the two random access response messages to the terminal device, the network device may add the two random access response messages to one medium access control protocol data unit MAC PDU) and send the MAC PDU to the terminal device. Because random access preamble identities (RAPID) of the two random access response messages received by the terminal device are the same, the terminal device considers that one of the random access response messages is the random access response message in the prior art, and the other is the random access response message provided in this embodiment. When the network device sends the two random access response messages to the terminal device, the network device may alternatively add the two random access response messages to two MAC PDUs respectively, and send the two MAC PDUs to the terminal device.

In the present invention, the separately sent RRC message is information generated by an RRC layer, and does not include an NAS message and/or user data. The RRC message may be an RRC connection setup request message or an RRC connection resume request message, or a new RRC message introduced for transmitting first data in a random access process.

Operation 403: The terminal device sends, based on a result of comparing a size of the transmission resource with a size of an RRC message and/or a result of comparing the/a size of the transmission resource with a size of second data, the first data to the network device by using a specified message.

The second data includes the RRC message and the first data, and the size of the second data is a sum of the size of the RRC message and a size of the first data. The RRC message is control information generated by the RRC layer, and does not include information delivered by the NAS and/or does not include user plane data. For example, when the RRC message is an RRC connection setup request message, the size of the RRC message is 56 bits. When the RRC message is an RRC connection resume request message, the size of the RRC message is 56 bits or 88 bits.

In implementation of operation 403, the following several cases exist:

Case 1: If the size of the transmission resource is greater than or equal to the size of the second data, the terminal device sends, in a position of the third message, the first data to the network device by using the RRC message, where the third message is the third message exchanged between the terminal device and the network device in an initial access process. Specifically, that the size of the transmission resource is greater than or equal to the size of the second data means that the size of the transmission resource is greater than or equal to the size of the second data. The subsequent process is similar and is not described here.

That the terminal device sends the first data to the network device by using the RRC message on a user plane means that the terminal device multiplexes the first data and the RRC message and sends the first data and the RRC message together to the network device. That the terminal device sends the first data to the network device by using the RRC message on a control plane means that the terminal device encapsulates the first data into a NAS message, where the NAS message is carried in the RRC message, and then sends the RRC message to the network device. In this case, the RRC message is an RRC message including the user data or the NAS message, which is different from the foregoing RRC message involved in size comparison.

In this way, compared with the prior art in which the terminal device sends the first data to the terminal device after establishing an RRC connection to the network device, in the foregoing method, the terminal device sends the first data to the network device by using the RRC message in an initial access process, so that the terminal device transmits the first data to the network device in advance, thereby reducing a delay in transmitting the first data and reducing resource consumption for transmitting the first data. The RRC message may be an RRC connection setup request message or an RRC connection resume request message, or may be a new RRC message introduced for transmitting the first data in a random access process.

Based on Case 1, an example in which the RRC message is an RRC connection setup request message is used. After the network device receives the RRC connection setup request message sent by the terminal device, the network device may establish an RRC connection to the terminal device. For a process of establishing the RRC connection, refer to the prior art. Details are not described herein. After the network device receives the RRC connection setup request message sent by the terminal device, because the terminal device has sent the first data to the network device by using the RRC message, if the network device determines that the terminal device currently has no other data to transmit than the first data, the network device may not establish an RRC connection to the terminal device. In this way, the terminal device transmits the first data to the network device in advance, thereby saving resources consumed when the network device establishes an RRC connection to the terminal device. Likewise, when the RRC message is an RRC connection resume request message, after the network device receives the RRC connection resume request message sent by the terminal device, the network device may resume the RRC connection to the terminal device, or may not resume the RRC connection to the terminal device.

In Case 1, if the size of the transmission resource is greater than or equal to the size of the second data, in addition to the foregoing method for sending the first data by using the RRC message, the terminal device may send the first data to the network device by using another method. For example, the terminal device may send partial data of the first data to the network device by using the RRC message, and send remaining data of the first data to the network device by using an uplink message or uplink scheduling following the RRC message. For another example, the terminal device may send the first data to the network device by using an uplink message following the third message exchanged with the network device in the initial access process.

Case 2: If the size of the transmission resource is greater than the size of the RRC message and the size of the transmission resource is smaller than the size of the second data, the terminal device sends, in a position of the third message, partial data of the first data to the network device by using the RRC message, where the third message is the third message exchanged between the terminal device and the network device in the initial access process. The terminal device sends the first data to the network device by using an uplink message or uplink scheduling following the third message.

The terminal device sends partial data of the first data to the network device by using the RRC message, and the terminal device sends remaining data of the first data to the network device by using an uplink message or uplink scheduling following the RRC message. An implementation on the user plane is similar to the foregoing implementation in which the terminal device sends the first data to the network device by using the RRC message on the user plane, an implementation on the control plane is similar to the foregoing implementation in which the terminal device sends the first data to the network device by using the RRC message on the control plane. Details are not described herein again.

In this way, compared with the prior art in which the terminal device sends the first data to the terminal device after establishing an RRC connection to the network device, in the foregoing method, the terminal device sends partial data of the first data to the network device by using the RRC message in an initial access process, so that the terminal device transmits the partial data of the first data to the network device in advance, thereby reducing a delay in transmitting the first data and reducing resource consumption for transmitting the partial data of the first data. The RRC message may be an RRC connection setup request message or an RRC connection resume request message, or may be a new RRC message introduced for transmitting the first data in a random access process.

Case 3: If the size of the transmission resource is greater than the size of the RRC message and the size of the transmission resource is smaller than the size of the second data, the terminal device sends, in a position of the third message, the RRC message to the network device, where the third message is the third message exchanged between the terminal device and the network device in the initial access process. The terminal device sends the first data to the network device by using an uplink message or uplink scheduling following the third message.

The terminal device sends the first data to the network device by using the uplink message following the third message exchanged with the network device in the initial access process, which is the same as that in the prior art. In this case, a problem that transmission resources are insufficient for sending the RRC message and the first data is resolved, and the terminal device may fall back to a data transmission procedure in the prior art.

Case 4: If the size of the transmission resource is equal to the size of the RRC message, the terminal device sends the RRC message to the network device by using the third message, where the third message is the third message exchanged between the terminal device and the network device in the initial access process. The terminal device sends the first data to the network device by using an uplink message or uplink scheduling following the third message.

In the foregoing case 3 and case 4, the third message exchanged by the terminal device with the network device in the initial access process may be an RRC message, for example, an RRC connection setup request message or an RRC connection resume request message, or a new RRC message introduced for transmitting the first data in the random access process. In this case, an uplink message following the third message may be understood as an uplink message that is sent by the terminal device to the network device and that follows the RRC message. In the case 3 and the case 4, before the terminal device sends the first data to the network device by using the uplink message following the third message, the terminal device sends the RRC message to the network device by using the third message. In this case, a problem that transmission resources are insufficient for sending the RRC message and the first data is resolved, and the terminal device may fall back to a data transmission procedure in the prior art.

In the foregoing case 2 to case 4, the uplink message following the RRC message may be the fifth message exchanged between the terminal device and the network device in an initial access process, and is usually referred to as a message 5. In an implementation, the RRC message is an RRC connection request message, and the message 5 is an RRC connection setup complete message. In another implementation, the RRC message is an RRC connection resume request message, and the message 5 is an RRC connection resume complete message.

In this embodiment, before the terminal device sends the RRC message to the network device, the terminal device automatically activates a context of the terminal device. In a user plane method, to send the first data in a position of the third message, the first data needs to be transmitted in a service channel. In this case, the first data needs to be processed by using context information of the terminal device. In the prior art, the context information is configured by the network device for the terminal device. In a method for transmitting data by using the message 5, the network device needs to activate the context information of the terminal device. However, in this embodiment of the present invention, in the user plane method, when the first data is sent in the position of the third message, the network device cannot activate the context information of the terminal device. Therefore, the terminal device needs to activate the context information of the terminal device for processing user plane data.

In this embodiment, before operation 401, the network device may send second information to the terminal device, where the second information is used to indicate at least one second random access resource, and the at least one second random access resource is used to indicate that the terminal device requests to transmit the first data in the initial access process. When determining that the first data needs to be transmitted in the initial access process, the terminal device may select one from the at least one second random access resource as the first random access resource. Because the first random access resource may include a random access preamble and/or a random access time-frequency resource, correspondingly, the second random access resource may also include a random access preamble and/or a random access time-frequency resource.

In the foregoing implementation, further, the second information sent by the network device to the terminal device may be used to indicate at least one second random access resource corresponding to each coverage level, and the at least one second random access resource corresponding to each coverage level is used to indicate that the terminal device at the coverage level requests to transmit the first data in the initial access process. When determining that the first data needs to be transmitted in the initial access process, the terminal device first determines a coverage level to which the terminal device belongs, and then selects, as the first random access resource, one from the at least one second random access resource corresponding to the coverage level to which the terminal device belongs.

In an implementation, the network device may send the second information to the terminal device by using a system message (SI). For example, a system broadcast message may be specifically a system information block type 2 (SIB2), where the SIB2 carries configuration information of a random access procedure, and the configuration information includes the second information.

Figure 9:
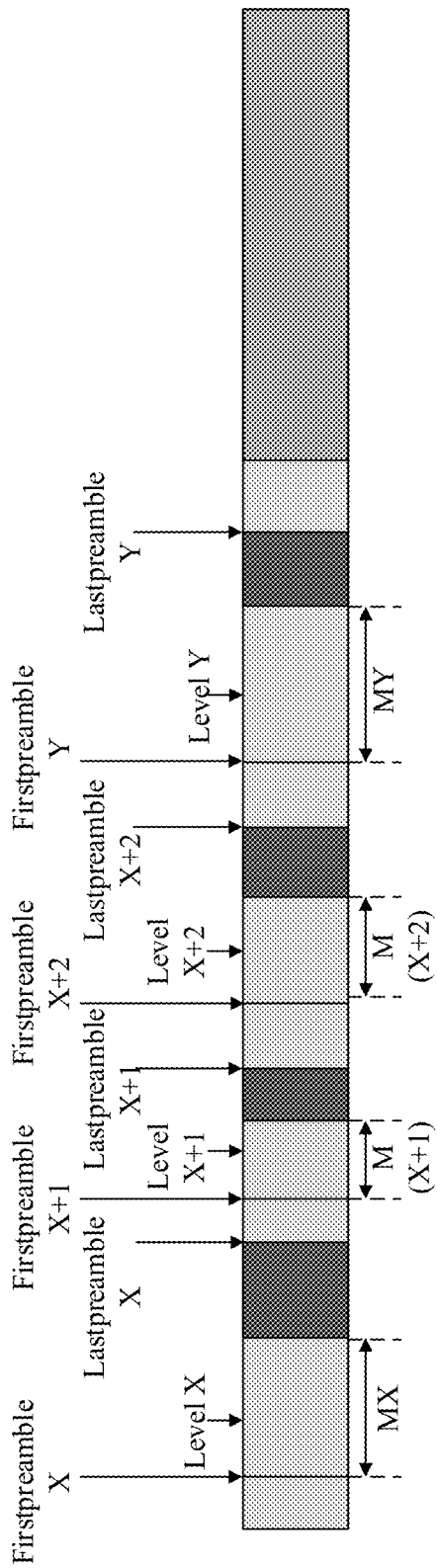
FIG. 9 is a schematic configuration diagram of a random access preamble according to an embodiment of this application.

The following uses an example in which the second random access resource includes a random access preamble. FIG. 9 is a schematic configuration diagram of a random access preamble. In FIG. 9, a level X to a level Y sequentially indicate a coverage level X to a coverage level Y (X and Y are non-negative integers, and X is greater than Y). Random access preambles of indexes firstPreambleX to lastPreambleX corresponding to the level X are used as random access preambles used by a terminal device at the coverage level X to perform random access. Random access preambles of MX indexes in the indexes firstPreambleX to lastPreambleX are used as random access preambles used by a terminal device at the coverage level X to request to transmit first data in an initial access process, where MX is a quantity of random access preambles used by the terminal device at the coverage level X to request to transmit the first data in the initial access process. The indexes of the MX random access preambles are firstPreambleX to firstPreambleX+MX−1. Likewise, random access preambles of indexes firstPreambleY to lastPreambleY corresponding to the level Y are used as random access preambles used by a terminal device at the coverage level Y to perform random access. Random access preambles of MY indexes in the indexes firstPreambleY to lastPreambleY are used as random access preambles used by a terminal device at the coverage level Y to request to transmit first data in an initial access process, where MY is a quantity of random access preambles used by the terminal device at the coverage level Y to request to transmit the first data in the initial access process. The indexes of the MY random access preambles are firstPreambleY to firstPreambleY+MY−1. The parameters MX and MY are included in the second information, and MX and MY are positive integers.

In another embodiment, the foregoing two index ranges may also be lastPreambleX−MX+1 to lastPreambleX and lastPreambleY+MY +1 to lastPreambleY.

In another embodiment, the MX may alternatively be a quantity of random access preambles for which the terminal device at the coverage level X does not request to transmit the first data in the initial access process, and the MY may alternatively be a quantity of random access preambles for which the terminal device at the coverage level Y does not request to transmit the first data in the initial access process.

That the second random access resource includes the random access preamble is used as an example. In this embodiment, an implementation in which the network device sends, to the terminal device, the second information used to indicate the at least one second random access resource includes but is not limited to the following three manners.

In a first implementation, the second information may include an index of a specific random access preamble at each coverage level, and the specific random access preamble at each coverage level is used to indicate that the terminal device at the coverage level requests to transmit the first data in the initial access process. In this case, the specific random access preamble is the second random access resource. Using a schematic configuration diagram of a random access preamble shown in FIG. 9 as an example, the second information includes: indexes of random access preambles that are in an MX range and that correspond to level X, that is, indexes firstPreambleX to firstPreambleX+MX−1, and indexes of random access preambles that are in an MY range and that correspond to level Y, that is, indexes firstPreambleY to firstPreambleY+MY−1. Alternatively, the foregoing two index ranges may also be lastPreambleX−MX+1 to lastPreambleX and lastPreambleY−MY+1 to lastPreambleY. The parameters MX and MY are included in the second information, and MX and MY are positive integers. The MX may alternatively be a quantity of random access preambles for which the terminal device at the coverage level X does not request to transmit the first data in the initial access process, and the MY may alternatively be a quantity of random access preambles for which the terminal device at the coverage level Y does not request to transmit the first data in the initial access process.

In another embodiment, the MX may alternatively be a quantity of random access preambles for which the terminal device at the coverage level X does not request to transmit the first data in the initial access process, and the MY may alternatively be a quantity of random access preambles for which the terminal device at the coverage level Y does not request to transmit the first data in the initial access process.

In a third implementation, the second information may include positions and percentages of specific random access preambles at each coverage level in all random access preambles at the coverage level, and the specific random access preamble at each coverage level is used by the terminal device at the coverage level to request to transmit the first data in an initial access process. The positions and the quantity of specific random access preambles at each coverage level in all random access preambles at the coverage level may be used to determine specific random access preambles at the coverage level. Using a schematic configuration diagram of a random access preamble shown in FIG. 9 as an example, the second information includes: that first MX random access preambles are the specific random access preambles at the coverage level X, and that first MY random access preambles at the coverage level Y. The second information indicates that the first MX random access preambles in firstPreambleX to lastPreambleX corresponding to the level X in FIG. 9 are specific random access preambles, and the first MY random access preambles in firstPreambleY to lastPreambleY corresponding to the level Y in FIG. 9 are specific random access preambles. The specific random access preambles are random access preambles used by the terminal device to request to transmit first data in the initial access process. Alternatively, the second information indicates that: Last MX random access preambles in firstPreambleX to lastPreambleX corresponding to the level X are specific random access preambles, and last MY random access preambles in firstPreambleY to lastPreambleY corresponding to the level Y are specific random access preambles. The specific random access preambles are random access preambles used by the terminal device to request to transmit first data in the initial access process.

In a second implementation manner, when positions and quantities of specific random access preambles at different coverage levels are the same in all random access preambles at the coverage level, the positions and quantities can be jointly indicated in the second information. A schematic configuration diagram of a random access preamble shown in FIG. 9 is used as an example. Specific random access preambles at each coverage level in levels X to Y are first N or last N random access preambles in all the random access preambles at the coverage level, and the quantity N is included in the second information. In this case, in FIG. 9, MX=M (X+1)=M (X+2)=MY=N.

It should be noted that, the positions of specific random access preambles at each coverage levels in all random access preambles at the coverage level may be the same or may be different, and the quantities of specific random access preambles at each coverage levels in all random access preambles at the coverage level may be the same or may be different.

In a third implementation, the second information may include positions and percentages of specific random access preambles at each coverage level in all random access preambles at the coverage level, and the specific random access preamble at each coverage level is used by the terminal device at the coverage level to request to transmit the first data in an initial access process. The positions and the quantity of specific random access preambles at each coverage level in all random access preambles at the coverage level may be used to determine specific random access preambles at the coverage level. Similar to the second implementation, a schematic configuration diagram of a random access preamble shown in FIG. 9 is used as an example. The second information includes: last $K\times(lastPreambleX-firstPreambleX+1)$ or first $K\times(lastPreambleX-firstPreambleX+1)$ preambles are specific random access preambles at the coverage level X, where k is a decimal between 0 and 1, and $K\times(lastPreambleX-firstPreambleX+1)$ is rounded up or rounded down. Last $L\times(lastPreambleY-firstPreambleY+1)$, or first $L\times(lastPreambleY-firstPreambleY+1)$ preambles are specific random access preambles at the coverage level Y, where L is a decimal between 0 and 1, and $L\times(lastPreambleY-firstPreambleY+1)$ is rounded up or rounded down. K and L are included in the second information.

In a third implementation manner, when positions and quantities of specific random access preambles at each coverage level are the same in all random access preambles at the coverage level, the positions and quantities can be jointly indicated in the second information. A schematic configuration diagram of a random access preamble shown in FIG. 9 is used as an example. If specific random access preambles at each coverage level in levels X to Y are first or last $K\times(lastPreambleX-firstPreambleX+1)$ random access preambles in all random access preambles at the coverage level, where K is a decimal between 0 and 1, and $K\times(lastPreambleX-firstPreambleX+1)$ is rounded up or rounded down. K is included in the second information.

It should be noted that, the positions of specific random access preambles at each coverage levels in all random access preambles at the coverage level may be the same or may be different, and the quantities of specific random access preambles at each coverage level in all random access preambles at the coverage level may be the same or may be different.

Figure 10:
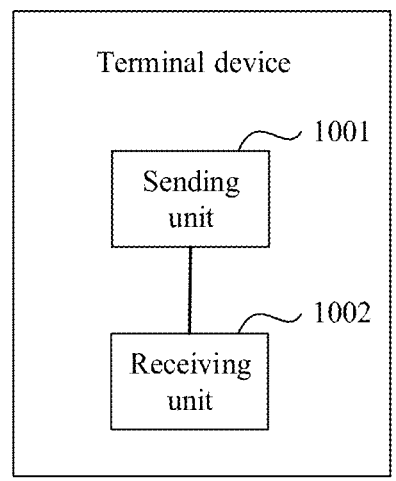
FIG. 10 is a schematic structural diagram of a terminal device according to an embodiment of this application.

Based on a same inventive concept, an embodiment of this application further provides a terminal device. The terminal device may implement the method performed by the terminal device in the method provided in the embodiment corresponding to FIG. 4. Referring to FIG. 10, the terminal device includes a sending unit 1001 and a receiving unit 1002.

The sending unit 1001 is configured to send a random access request message to a network device by using a first random access resource, where the first random access resource is used to indicate that the terminal device requests to transmit first data in an initial access process.

The receiving unit 1002 is configured to receive a random access response message that is sent by the network device and that includes first information, where the first information is used to indicate a transmission resource allocated by the network device to the terminal device.

The sending unit 1001 is further configured to send, based on a result of comparing a size of the transmission resource with a size of an RRC message and/or a result of comparing the/a size of the transmission resource with a size of second data, the first data to the network device by using a specified message, where the size of the second data is a sum of the size of the RRC message and a size of the first data.

In one embodiment, the first random access resource includes a random access preamble and/or a random access time-frequency resource.

In one embodiment, the receiving unit 1002 is further configured to: before the sending unit 1001 sends the random access request message to the network device by using the first random access resource, receive second information sent by the network device, where the second information is used to indicate at least one second random access resource, and the at least one second random access resource is used to indicate that the terminal device requests to transmit the first data in the initial access process; and the terminal device further includes: a processing unit, configured to: when determining that the first data needs to be transmitted in the initial access process, select one from the at least one second random access resource as the first random access resource.

In one embodiment, that the second information is used to indicate at least one second random access resource, and the at least one second random access resource is used to indicate that the terminal device requests to transmit the first data in the initial access process is specifically: The second information is used to indicate at least one second random access resource corresponding to each coverage level, and the at least one second random access resource corresponding to each coverage level is used to indicate that the terminal device at the coverage level requests to transmit the first data in the initial access process.

In one embodiment, when the second random access resource includes a random access preamble, that the second information is used to indicate at least one second random access resource is specifically: the second information includes an index of at least one random access preamble; the second information includes positions and a quantity of random access preambles, in all contention-based random access preambles, that are used to indicate that the terminal device requests to transmit the first data in the initial access process; or the second information includes positions and percentages of random access preambles, in all contention-based random access preambles, that are used to indicate that the terminal device requests to transmit the first data in the initial access process.

In one embodiment, the terminal device further includes: the processing unit, configured to: before the sending unit 1001 sends the random access request message to the network device by using the first random access resource, determine, by using an RRC layer, that the network device supports data transmission in the initial access process; and notify, by using the RRC layer, a NAS of the terminal device that the network device supports data transmission in the initial access process.

In one embodiment, when sending, based on the result of comparing the size of the transmission resource with the size of the RRC message and/or the result of comparing the size of the transmission resource with the size of the second data, the first data to the network device by using the specified message, the sending unit 1001 is specifically configured to: if the size of the transmission resource is greater than or equal to the size of the second data, send, in a position of the third message that is sent between the terminal device and the network device in the initial access process, the first data to the network device by using the RRC message; if the size of the transmission resource is greater than the size of the RRC message and the size of the transmission resource is less than the size of the second data, send, in a position of the third message that is sent between the terminal device and the network device in the initial access process, partial data of the first data to the network device by using the RRC message, and send remaining data of the first data to the network device by using an uplink message following the RRC message; if the size of the transmission resource is greater than the size of the RRC message and the size of the transmission resource is less than the size of the second data, send the first data to the network device by using an uplink message following the third message that is sent between the terminal device and the network device in the initial access process; or if the size of the transmission resource is equal to the size of the RRC message, send the first data to the network device by using an uplink message following the third message that is sent between the terminal device and the network device in the initial access process.

In one embodiment, the sending unit 1001 is further configured to: before sending the first data to the network device by using the uplink message following the third message that is sent between the terminal device and the network device in the initial access process, send the RRC message to the network device in the position of the third message that is sent between the terminal device and the network device in the initial access process.

In one embodiment, the terminal device further includes: the processing unit, configured to: before the sending unit 1001 sends the RRC message to the network device, automatically activate a context of the terminal device.

In one embodiment, the RRC message is an RRC connection setup request message or an RRC connection resume request message.

In one embodiment, the terminal device is a device that performs MTC.

It should be noted that, in this embodiment of this application, unit division is an example, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes one or more instructions for instructing a computer device (which may be a personal computer, a server, or a network device) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

Figure 11:
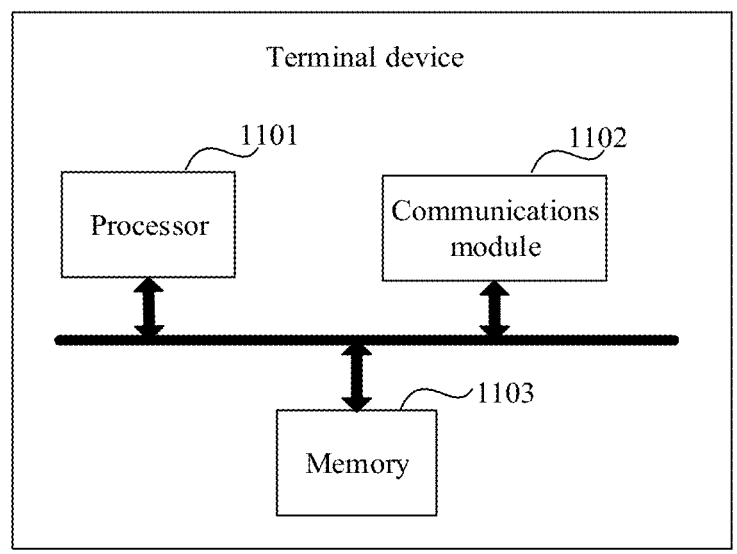
FIG. 11 is a schematic structural diagram of another terminal device according to an embodiment of this application.

Based on a same inventive concept, an embodiment of this application further provides a terminal device. The terminal device uses the method performed by the terminal device in the method provided in the embodiment corresponding to FIG. 4, and may be a device the same as the terminal device shown in FIG. 10. Referring to FIG. 11, the terminal device includes a processor 1101, a communications module 1102, and a memory 1103.

The processor 1101 is configured to read a program in the memory 1103, to perform the following processes according to one embodiment:

sending, by using the communications module 1102, a random access request message to a network device by using a first random access resource, where the first random access resource is used to indicate that the terminal device requests to transmit first data in an initial access process;

receiving, by using the communications module 1102, a random access response message that is sent by the network device and that includes first information, where the first information is used to indicate a transmission resource allocated by the network device to the terminal device; and sending, by using the communications module 1102 and based on a result of comparing a size of the transmission resource with a size of a radio resource control RRC message and/or a result of comparing the/a size of the transmission resource with a size of second data, the first data to the network device by using a specified message, where the size of the second data is a sum of the size of the RRC message and a size of the first data.

In one embodiment, the first random access resource includes a random access preamble and/or a random access time-frequency resource.

In one embodiment, the processor 1101 is further configured to read the program in the memory 1103, to perform the following process: before sending, by using the communications module 1102, the random access request message to the network device by using the first random access resource, receiving, by using the communications module 1102, second information sent by the network device, where the second information is used to indicate at least one second random access resource, and the at least one second random access resource is used to indicate that the terminal device requests to transmit the first data in the initial access process; and the processor 1101 is further configured to read the program in the memory 1103, to perform the following process: when determining that the first data needs to be transmitted in the initial access process, selecting one from the at least one second random access resource as the first random access resource.

In one embodiment, that the second information is used to indicate at least one second random access resource, and the at least one second random access resource is used to indicate that the terminal device requests to transmit the first data in the initial access process is specifically: The second information is used to indicate at least one second random access resource corresponding to each coverage level, and the at least one second random access resource corresponding to each coverage level is used to indicate that the terminal device at the coverage level requests to transmit the first data in the initial access process.

In one embodiment, when the second random access resource includes a random access preamble, that the second information is used to indicate at least one second random access resource is specifically:

the second information includes an index of at least one random access preamble;

the second information includes positions and a quantity of random access preambles, in all contention-based random access preambles, that are used to indicate that the terminal device requests to transmit the first data in the initial access process; or the second information includes positions and percentages of random access preambles, in all contention-based random access preambles, that are used to indicate that the terminal device requests to transmit the first data in the initial access process.

In one embodiment, the processor 1101 is further configured to read the program in the memory 1103, to perform the following processes: before sending, by using the communications module 1102, the random access request message to the network device by using the first random access resource, determining, by using an RRC layer, that the network device supports data transmission in the initial access process; and notifying, by using the RRC layer, a non-access stratum NAS of the terminal device that the network device supports data transmission in the initial access process.

In one embodiment, when sending, by using the communications module 1102 and based on the result of comparing the size of the transmission resource with the size of the radio resource control RRC message and/or the result of comparing the size of the transmission resource with the size of the second data, the first data to the network device by using the specified message, the processor 1101 is specifically configured to:

if the size of the transmission resource is greater than or equal to the size of the second data, send, in a position of the third message that is sent between the terminal device and the network device in the initial access process, the first data to the network device by using the RRC message;

if the size of the transmission resource is greater than the size of the RRC message and the size of the transmission resource is less than the size of the second data, send, in a position of the third message that is sent between the terminal device and the network device in the initial access process, partial data of the first data to the network device by using the RRC message, and send remaining data of the first data to the network device by using an uplink message following the RRC message;

if the size of the transmission resource is greater than the size of the RRC message and the size of the transmission resource is less than the size of the second data, send the first data to the network device by using an uplink message following the third message that is sent between the terminal device and the network device in the initial access process; or if the size of the transmission resource is equal to the size of the RRC message, send the first data to the network device by using an uplink message following the third message that is sent between the terminal device and the network device in the initial access process.

In one embodiment, the processor 1101 is further configured to: before sending the first data to the network device by using the uplink message following the third message that is sent between the terminal device and the network device in the initial access process, send, by using the communications module 1102, the RRC message to the network device in the position of the third message that is sent between the terminal device and the network device in the initial access process.

In one embodiment, the processor 1101 is further configured to read the program in the memory 1103, to perform the following process: before sending the RRC message to the network device by using the communications module 1102, automatically activating a context of the terminal device.

In one embodiment, the RRC message is an RRC connection setup request message or an RRC connection resume request message.

In one embodiment, the terminal device is a device that performs machine type communication MTC.

The processor 1101, the communications module 1102, and the memory 1103 may be implemented as a general bus architecture by using a bus. Based on a specific application and an overall design constraint that are of the terminal device, the bus may include any quantity of interconnecting buses and bridges, and specifically, various circuits of one or more processors represented by the processor 1101 and a memory represented by the memory 1103 are connected together. The bus architecture may further connect various other circuits such as a peripheral device, a voltage stabilizer, and a power management circuit. These are well known in the art, and therefore are not further described in this specification. A bus interface provides an interface. The communications module 1102 may include a plurality of components, that is, include a transmitter and a receiver, or include a communications interface. The communications interface has receiving and sending functions, and provides a unit configured to communicate with various other apparatuses on a transmission medium. The processor 1101 is responsible for managing the bus architecture and usual processing. The memory 1103 may store data used when the processor 1101 performs an operation.

Optionally, the processor 1101 may be a central processing unit, an application-specific integrated circuit (ASIC), a field programmable gate array (FPGA), or a complex programmable logical device (CPLD).

An embodiment of this application further provides a computer storage medium. The storage medium stores a software program. When being read and executed by one or more processors, the software program may implement the data transmission method performed by the terminal device in the foregoing embodiment.

An embodiment of this application further provides a data transmission apparatus. The apparatus includes a chip, and the chip is configured to perform the method performed by the terminal device in the foregoing data transmission method. The apparatus may further include a communications module. The chip included in the apparatus performs, by using the communications module, a method for receiving data and/or sending data by the terminal device in the foregoing data transmission method.

An embodiment of this application provides a computer program product including an instruction. When the computer program product runs on a computer, the computer is enabled to perform the data transmission method performed by the terminal device in the foregoing embodiment.

Figure 12:
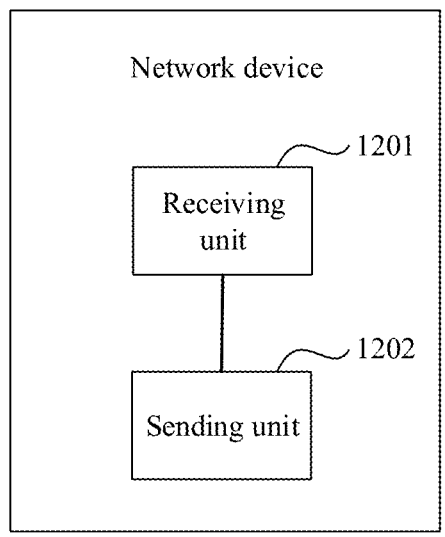
FIG. 12 is a schematic structural diagram of a network device according to an embodiment of this application.

Based on a same inventive concept, an embodiment of this application further provides a network device. The network device may implement the method performed by the network device in the method provided in the embodiment corresponding to FIG. 4. Referring to FIG. 12, the network device includes a receiving unit 1201 and a sending unit 1202.

The receiving unit 1201 is configured to receive a random access request message that is sent by a terminal device by using a first random access resource, where the first random access resource is used to indicate that the terminal device requests to transmit first data in an initial access process.

The sending unit 1202 is configured to send, to the terminal device, a random access response message that includes first information, where the first information is used to indicate a transmission resource allocated by the network device to the terminal device.

The receiving unit 1201 is further configured to receive the first data that is sent by the terminal device by using a specified message, where the specified message is determined by the terminal device based on a result of comparing a size of the transmission resource with a size of a radio resource control RRC message and/or a result of comparing the/a size of the transmission resource with a size of second data, and the size of the second data is a sum of the size of the RRC message and a size of the first data.

In one embodiment, the first random access resource includes a random access preamble and/or a random access time-frequency resource.

In one embodiment, the sending unit 1202 is further configured to:

before the receiving unit 1201 receives the random access request message that is sent by the terminal device by using the first random access resource, send second information to the terminal device, where the second information is used to indicate at least one second random access resource, the at least one second random access resource is used to indicate that the terminal device requests to transmit the first data in the initial access process, and the first random access resource is one of the at least one second random access resource.

In one embodiment, that the second information is used to indicate at least one second random access resource, and the at least one second random access resource is used to indicate that the terminal device requests to transmit the first data in the initial access process is specifically:

the second information is used to indicate at least one second random access resource corresponding to each coverage level, and the at least one second random access resource corresponding to each coverage level is used to indicate that the terminal device at the coverage level requests to transmit the first data in the initial access process.

In one embodiment, when the second random access resource includes a random access preamble, that the second information is used to indicate at least one second random access resource is specifically:

the second information includes an index of at least one random access preamble;

the second information includes positions and a quantity of random access preambles, in all contention-based random access preambles, that are used to indicate that the terminal device requests to transmit the first data in the initial access process; or the second information includes positions and percentages of random access preambles, in all contention-based random access preambles, that are used to indicate that the terminal device requests to transmit the first data in the initial access process.

In one embodiment, when receiving the first data that is sent by the terminal device by using the specified message, the receiving unit 1201 is specifically configured to:

receive, in a position of the third message that is sent between the network device and the terminal device in the initial access process, the first data that is sent by the terminal device by using the RRC message;

receive, in a position of the third message that is sent between the network device and the terminal device in the initial access process, partial data of the first data that is sent by the terminal device by using the RRC message, and receive remaining data of the first data that is sent by the terminal device by using an uplink message following the RRC message; or receive the first data that is sent by the terminal device by using an uplink message following the third message that is sent between the terminal device and the network device in the initial access process.

In one embodiment, the receiving unit 1201 is further configured to:

before receiving the first data that is sent by the terminal device by using the uplink message following the third message that is sent between the terminal device and the network device in the initial access process, receive the RRC message that is sent by the terminal device in the position of the third message that is sent between the terminal device and the network device in the initial access process.

In one embodiment, the RRC message is an RRC connection setup request message or an RRC connection resume request message.

Figure 13:
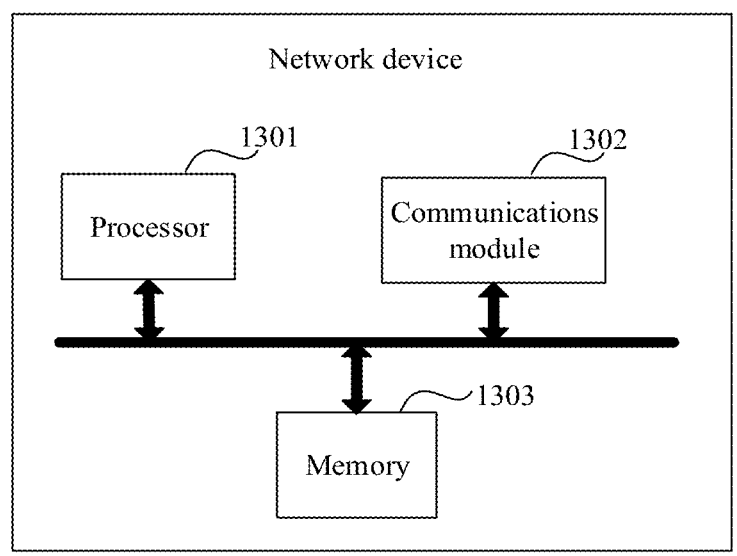
FIG. 13 is a schematic structural diagram of another network device according to an embodiment of this application.

Based on a same inventive concept, an embodiment of this application further provides a network device. The network device may implement the method performed by the network device in the method provided in the embodiment corresponding to FIG. 4, and may be a device the same as the network device shown in FIG. 12. Referring to FIG. 13, the network device includes a processor 1301, a communications module 1302, and a memory 1303.

The processor 1301 is configured to read a program in the memory 1303, to perform the following processes:

receiving, by using the communications module 1302, a random access request message that is sent by a terminal device by using a first random access resource, where the first random access resource is used to indicate that the terminal device requests to transmit first data in an initial access process;

sending, by using the communications module 1302 to the terminal device, a random access response message that includes first information, where the first information is used to indicate a transmission resource allocated by the network device to the terminal device; and receiving, by using the communications module 1302, the first data that is sent by the terminal device by using a specified message, where the specified message is determined by the terminal device based on a result of comparing a size of the transmission resource with a size of a radio resource control RRC message and/or a result of comparing the/a size of the transmission resource with a size of second data, and the size of the second data is a sum of the size of the RRC message and a size of the first data.

In one embodiment, the first random access resource includes a random access preamble and/or a random access time-frequency resource.

In one embodiment, the processor 1301 is further configured to read the program in the memory 1303, to perform the following process:

before receiving, by using the communications module 1302, the random access request message that is sent by the terminal device by using the first random access resource, sending second information to the terminal device by using the communications module 1302, where the second information is used to indicate at least one second random access resource, the at least one second random access resource is used to indicate that the terminal device requests to transmit the first data in the initial access process, and the first random access resource is one of the at least one second random access resource.

In one embodiment, that the second information is used to indicate at least one second random access resource, and the at least one second random access resource is used to indicate that the terminal device requests to transmit the first data in the initial access process is specifically:

the second information is used to indicate at least one second random access resource corresponding to each coverage level, and the at least one second random access resource corresponding to each coverage level is used to indicate that the terminal device at the coverage level requests to transmit the first data in the initial access process.

In one embodiment, when the second random access resource includes a random access preamble, that the second information is used to indicate at least one second random access resource is specifically:

the second information includes an index of at least one random access preamble;

the second information includes positions and a quantity of random access preambles, in all contention-based random access preambles, that are used to indicate that the terminal device requests to transmit the first data in the initial access process; or the second information includes positions and percentages of random access preambles, in all contention-based random access preambles, that are used to indicate that the terminal device requests to transmit the first data in the initial access process.

In one embodiment, when receiving, by using the communications module 1302, the first data that is sent by the terminal device by using the specified message, the processor 1301 is specifically configured to:

receive, by using the communications module 1302 in a position of the third message that is sent between the network device and the terminal device in the initial access process, the first data that is sent by the terminal device by using the RRC message;

receive, by using the communications module 1302 in a position of the third message that is sent between the network device and the terminal device in the initial access process, partial data of the first data that is sent by the terminal device by using the RRC message, and receive remaining data of the first data that is sent by the terminal device by using an uplink message following the RRC message; or receive, by using the communications module 1302, the first data that is sent by the terminal device by using an uplink message following the third message that is sent between the terminal device and the network device in the initial access process.

In one embodiment, before receiving, by using the communications module 1302, the first data that is sent by the terminal device by using the uplink message following the third message that is sent between the terminal device and the network device in the initial access process, the processor 1301 receives, by using the communications module 1302, the RRC message that is sent by the terminal device in the position of the third message that is sent between the terminal device and the network device in the initial access process.

In one embodiment, the RRC message is an RRC connection setup request message or an RRC connection resume request message.

The processor 1301, the communications module 1302, and the memory 1303 may be implemented as a general bus architecture by using a bus. Based on a specific application and an overall design constraint that are of the network device, the bus may include any quantity of interconnecting buses and bridges, and specifically, various circuits of one or more processors represented by the processor 1301 and a memory represented by the memory 1303 are connected together. The bus architecture may further connect various other circuits such as a peripheral device, a voltage stabilizer, and a power management circuit. These are well known in the art, and therefore are not further described in this specification. A bus interface provides an interface. The communications module 1302 may include a plurality of components, that is, include a transmitter and a receiver, or include a communications interface. The communications interface has receiving and sending functions, and provides a unit configured to communicate with various other apparatuses on a transmission medium. The processor 1301 is responsible for managing the bus architecture and usual processing. The memory 1303 may store data used when the processor 1301 performs an operation.

Optionally, the processor 1301 may be a central processing unit, an ASIC, an FPGA, ora CPLD.

An embodiment of this application further provides a computer storage medium. The storage medium stores a software program. When being read and executed by one or more processors, the software program may implement the data transmission method performed by the network device in the foregoing embodiment.

An embodiment of this application further provides a data transmission apparatus. The apparatus includes a chip, and the chip is configured to perform the method performed by the network device in the foregoing data transmission method. The apparatus may further include a communications module. The chip included in the apparatus performs, by using the communications module, a method for receiving data and/or sending data by the network device in the foregoing data transmission method.

An embodiment of this application provides a computer program product including an instruction. When the computer program product runs on a computer, the computer is enabled to perform the data transmission method performed by the network device in the foregoing embodiment.

Figure 14:
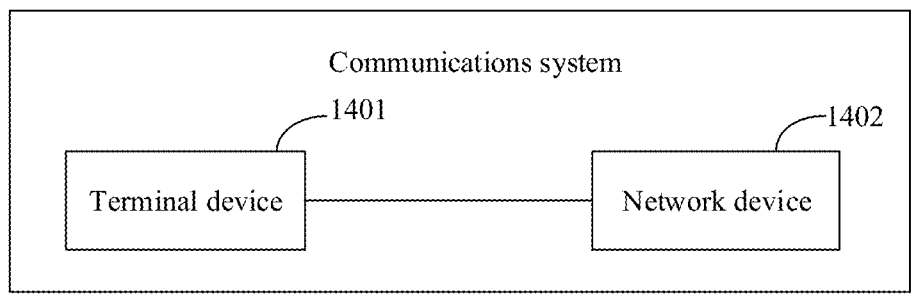
FIG. 14 is a schematic structural diagram of a communications system according to an embodiment of this application.

Based on a same inventive concept, an embodiment of this application further provides a communications system. As shown in FIG. 14, the communications system includes a terminal device 1401 and a network device 1402. The terminal device 1401 is configured to perform the method performed by the terminal device in the method provided in the embodiment corresponding to FIG. 4, and the terminal device 1401 may be a device the same as the terminal device shown in FIG. 10 or FIG. 11. The network device 1402 is configured to perform the method performed by the network device in the method provided in the embodiment corresponding to FIG. 4, and the network device 1402 may be a device the same as the network device shown in FIG. 12 or FIG. 13. The data transmission method provided in the embodiments of this application may be implemented by using the communications system.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A data transmission method, comprising:
receiving, by a terminal device, second information sent by a network device, wherein the second information is used to indicate at least one second random access resource, and the at least one second random access resource is used to indicate that the terminal device requests to transmit a first data in an initial access process;
when determining that the first data needs to be transmitted in the initial access process, selecting, by the terminal device, one from the at least one second random access resource as a first random access resource;
sending, by the terminal device, a random access request message to the network device by using the first random access resource, wherein the first random access resource is used to indicate that the terminal device requests to transmit the first data in the initial access process, and the random access request message comprises a random access preamble;
receiving, by the terminal device, a random access response message that is sent by the network device and that comprises first information, wherein the first information is used to indicate a transmission resource allocated by the network device to the terminal device, and the transmission resource is used to transmit a radio resource control (RRC) message; and
sending, by the terminal device based on at least one of a result of comparing a size of the transmission resource with a size of the RRC message and a result of comparing the size of the transmission resource with a size of a second data, the first data to the network device by using a specified message, wherein the second data comprises the RRC message and the first data, and the size of the second data is a sum of the size of the RRC message and a size of the first data.

2. The method according to claim 1, wherein the first information is indicated by a reserved bit "R".

3. The method according to claim 1, wherein the first random access resource comprises at least one of a random access preamble and a random access time-frequency resource.

4. The method according to claim 1, wherein that the second information is used to indicate at least one second random access resource, and the at least one second random access resource is used to indicate that the terminal device requests to transmit the first data in the initial access process is:

the second information is used to indicate at least one second random access resource corresponding to each coverage level, and the at least one second random access resource corresponding to each coverage level is used to indicate that the terminal device at the coverage level requests to transmit the first data in the initial access process.

5. The method according to claim 1, wherein the sending, by the terminal device based on at least one of a result of comparing a size of the transmission resource with a size of the RRC message and a result of comparing the size of the transmission resource with a size of second data, the first data to the network device by using a specified message comprises:

if the size of the transmission resource is greater than or equal to the size of the second data, sending, by the terminal device, the first data to the network device by using the RRC message;

if the size of the transmission resource is greater than the size of the RRC message and the size of the transmission resource is less than the size of the second data, sending, by the terminal device, partial data of the first data to the network device by using the RRC message, and sending remaining data of the first data to the network device by using an uplink message following the RRC message;

if the size of the transmission resource is greater than the size of the RRC message and the size of the transmission resource is less than the size of the second data, sending, by the terminal device, the first data to the network device by using an uplink message following the RRC message; or if the size of the transmission resource is equal to the size of the RRC message, sending, by the terminal device, the first data to the network device by using an uplink message following the RRC message.

6. The method according to claim 5, wherein before the sending, by the terminal device, the RRC message to the network device, the method further comprises:

activating, by the terminal device, a context of the terminal device.

7. The method according to claim 1, wherein the RRC message is an RRC connection setup request message or an RRC connection resume request message.

8. A data transmission method, comprising:

sending, by a network device, second information to a terminal device, wherein the second information is used to indicate at least one second random access resource, the at least one second random access resource is used to indicate that the terminal device requests to transmit a first data in an initial access process, and a first random access resource is one of the at least one second random access resource;

receiving, by the network device, a random access request message that is sent by the terminal device by using the first random access resource, wherein the first random access resource is used to indicate that the terminal device requests to transmit the first data in the initial access process, and the random access request message comprises a random access preamble;

sending, by the network device to the terminal device, a random access response message that comprises first information, wherein the first information is used to indicate a transmission resource allocated by the network device to the terminal device, and the transmission resource is used to transmit a radio resource control (RRC) message; and receiving, by the network device, the first data that is sent by the terminal device by using a specified message, wherein the specified message is determined by the terminal device based on at least one of a result of comparing a size of the transmission resource with a size of the RRC message and a result of comparing the size of the transmission resource with a size of a second data, and the second data comprises the RRC message and the first data, and the size of the second data is a sum of the size of the RRC message and a size of the first data.

9. The method according to claim 8, wherein the first information is indicated by a reserved bit "R".

10. The method according to claim 8, wherein the first random access resource comprises at least one of a random access preamble and a random access time-frequency resource.

11. The method according to claim 8, wherein that the second information is used to indicate at least one second random access resource, and the at least one second random access resource is used to indicate that the terminal device requests to transmit the first data in the initial access process is:

the second information is used to indicate at least one second random access resource corresponding to each coverage level, and the at least one second random access resource corresponding to each coverage level is used to indicate that the terminal device at the coverage level requests to transmit the first data in the initial access process.

12. The method according to claim 8, wherein the receiving, by the network device, the first data that is sent by the terminal device by using a specified message comprises:

receiving, by the network device, the first data that is sent by the terminal device by using the RRC message;

receiving, by the network device, partial data of the first data that is sent by the terminal device by using the RRC message, and receiving remaining data of the first data that is sent by the terminal device by using an uplink message following the RRC message; or receiving, by the network device, the first data that is sent by the terminal device by using an uplink message following the RRC message.

13. The method according to claim 8, wherein the RRC message is an RRC connection setup request message or an RRC connection resume request message.

14. An apparatus, comprising:

a storage medium configured to store program instructions; and one or more processors in communication with the storage medium, wherein the one or more processors execute the program instructions to enable the apparatus to perform operations comprising:

receiving second information sent by a network device, wherein the second information is used to indicate at least one second random access resource, and the at least one second random access resource is used to indicate that a terminal device requests to transmit a first data in an initial access process;

when determining that the first data needs to be transmitted in the initial access process, selecting one from the at least one second random access resource as a first random access resource;

sending a random access request message to the network device by using the first random access resource, wherein the first random access resource is used to indicate that the terminal device requests to transmit the first data in the initial access process, and the random access request message comprises a random access preamble; and receiving a random access response message that is sent by the network device and that comprises first information, wherein the first information is used to indicate a transmission resource allocated by the network device to the terminal device, and the transmission resource is used to transmit a radio resource control (RRC) message; and sending, based on at least one of a result of comparing a size of the transmission resource with a size of the RRC message and a result of comparing the/a size of the transmission resource with a size of a second data, the first data to the network device by using a specified message, wherein the second data comprises the RRC message and the first data, and the size of the second data is a sum of the size of the RRC message and a size of the first data.

15. The apparatus according to claim 14, wherein the first information is indicated by a reserved bit "R".

16. The apparatus according to claim 14, wherein the first random access resource comprises at least one of a random access preamble and a random access time-frequency resource.

17. The apparatus according to claim 14, wherein that the second information is used to indicate at least one second random access resource, and the at least one second random access resource is used to indicate that the terminal device requests to transmit the first data in the initial access process is:

the second information is used to indicate at least one second random access resource corresponding to each coverage level, and the at least one second random access resource corresponding to each coverage level is used to indicate that the terminal device at the coverage level requests to transmit the first data in the initial access process.

* * * * *